United States Patent Office 2,793,165
Patented May 21, 1957

2,793,165

EMPLOYMENT OF PEROXIDE FORMATION INHIBITOR IN NUTRIENT MEDIA CONTAINING TRIGLYCERIDE OIL

Stephen Aloysius Szumski, Pearl River, N. Y., assignor to American Cyanamid Company, New York, N. Y., a corporation of Maine No Drawing. Application September 23, 1953, Serial No. 382,006

12 Claims. (Cl. 195—80)

This invention relates to the production of an antibiotic by the microbiological fermentation by a streptomyces of a nutrient medium containing triglyceride oil containing unsaturated fatty acids as an antifoam or nutrient or both, which oil contains a peroxide formation inhibitor of the class frequently called antioxidants.

One such antibiotic is chlortetracycline which is produced by the organism *Streptomyces aureofaciens* as described in U. S. Patent 2,482,055 entitled "Aureomycin and Preparation of Same" to Benjamin M. Duggar dated September 13, 1949.

Chlortetracycline is produced and sold under the commercial designation "Aureomycin" which, in certain countries, is a trademark of the American Cyanamid Company. Chlortetracycline has been found to be a naphthacene derivative and while having a structure which strongly suggests tautomeric forms, is believed to exist with the following probable structure:

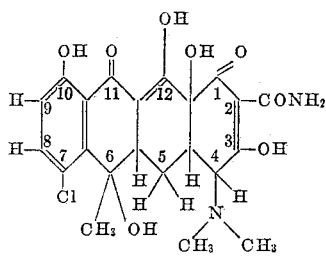

A numbering system is shown for the molecule. One proper name for the compound is 7-chloro-4-dimethylamino-1, 4, 4a, 5, 5a, 6, 11, 12a-octahydro-3, 6, 10, 12, 12a-pentahydroxy - 6 - methyl-1, 11-dioxo-2-naphthacenecarboxamide. The generic term for the compound is chlortracycline, sometimes spelled "chlorotetracycline" (Note: Journal of the American Chemical Society, 74: 4976 (1952)).

Further details of a medium particularly suited for the growth of *Streptomyces aureofaciens* are described in the U. S. Patent 2,609,329, entitled "Process of Producing Aureomycin," to J. G. Neidercorn, dated September 2, 1952.

The streptomyces, particularly those producing an antibiotic containing an octahydronaphthacene nucleus, are normally fermented in the presence of an organic nitrogen source, such as corn steep liquor, a carbohydrate, such as a starch or sugar, and an inorganic supplement containing the inorganic ions ammonium, ferrous magnesium, manganous, potassium, zinc, phosphate and sulfate, and in the case of the production of chlortetracycline, chloride and a chlortetracycline precipitating quantity of an alkaline earth ion such as calcium, which may be present as calcium carbonate.

At least part of the energy source may be a glyceride oil. Lard oil, for example, is an excellent energy yielding constituent for the mash and may be used to replace part of the carbohydrate with a resulting increase in yield. In attempting to increase the yields of the antibiotics there are many factors to be considered which affect the yield. Frequently the yield is limited by some one factor and regardless of what changes may be made in other factors, the yield cannot be increased. In other instances, a variation in one factor will cause a variation in the yield even though other controlling limitations may cause the yield to attain either a comparatively high or low figure.

In the use of the glyceride oils, such as lard oil, corn oil, peanut oil, cottonseed oil, esterified tall oil, soya bean oil, olive oil, sperm oil, palm oil, and whale oil, in the nutrient medium, the addition of a peroxide formation inhibitor, to the oil, before incorporation of the oil in the medium, increases the yields of the desired antibiotics such as chlortetracycline. The peroxide-formation inhibitor, called a peroxide inhibitor for short, may be added to the oil at any time. Preferably it is added to the oil as soon as convenient to reduce the risk of formation of peroxides during shipment and storage of the oil. The peroxide concentration of the oil may be measured in accordance with commercial practice such as described in Oil and Soap, 10, 105-109 (June 1933).

Many peroxide inhibitors are known which prevent the oxidative degeneration of the oil; among such are: propylene glycol solutions of butylated hydroxyanisole, n-propyl gallate and citric acid. One such product is sold on the commercial market under the name "Tenox II" by the Tennessee Eastman Company, and consists of propylene glycol 70%, butylated hydroxyanisole 20%, citric acid 4%, and propyl gallate 6%. Other alkylated gallic esters, alkylated anisoles, with synergizing acids, such as citric, ortho-phosphoric or tartaric may be used. A description of such peroxide inhibitors and methods of their preparation is given at length in U. S. Patents 2,607,745 and 2,607,746 to James E. Magoffin, each entitled "Composition Useful as an Antioxidant for Fats and Oils." Other effective peroxide inhibitors are described in U. S. Patents to Lloyd A. Hall, 2,518,233, 2,511,804, 2,511,803, 2,511,802, 2,500,543 and 2,493,288.

From 0.05 to 0.5% of these peroxide inhibitors when added to an oil before use in a fermentor increases the yield of an antibiotic. Coincidentally, it also prevents rancidity of the oil on storage. A fresh lard oil will give an increased yield if treated with the peroxide inhibitor before use.

This clearly shows that the use of the peroxide inhibitor has an effect other than the simple prevention of rancidity. However, if the oil is stored prior to use, under such conditions as to permit the oil to become rancid, the oil when used in a fermentation medium has a deleterious effect on the yield. The use of the peroxide inhibitor not only prevents rancidity, but increases the yield to be expected from the use of the oil during fermentation. The greater the capacity of the peroxide inhibitor to prevent peroxide formation, or reduce the level of peroxide already existing in the oil, the greater its efficacy in increasing the antibiotic yield.

The improvement obtained by the use of the peroxide inhibitor in the triglyceride oils is noticeable with any medium containing a triglyceride oil, but is more apparent with high yielding fermentation media. For example, a poor strain of the fermenting organism or a phage infection or some other accident may reduce the yield of the antibiotic, but in the absence of some such accidental limiting factor the peroxide inhibitor not only permits the use of a stored triglyceride oil, but gives an actual increase in yield over the same oil when used fresh.

In laboratory shaker flasks with a medium containing 30 grams per liter of corn steep liquor, 50% solids, penicillin grade; 9 grams per liter of calcium carbonate; U. S. Pharmacopeia grade; 3.3 grams of ammonium sulfate; 1 gram of ammonium chloride; 2 grams of magnesium chloride hexahydrate; 100 mg. of zinc sulfate heptahydrate; together with traces of iron, manganese, and cobalt; and 10 grams of lard oil, Armour's extra-winter strain; the following results were obtained in a chlortetracycline fermentation.

A lard oil which contained 0.05% of peroxide inhibitor (Tenox II), and stored for 4 days at 27° C. gave a yield of 106% as contrasted with 88% for a sample not containing the peroxide inhibitor, but otherwise the same. Comparable values, after storage, of the oils for 7 days at 27° C. were 112% and 84%. The values quoted are percentages of the yields obtained with a fresh sample of the same oil to which no peroxide inhibitor had been added.

In a similar experiment, using 37° C. storage for the oil, for 4 days, a peroxide inhibitor containing oil gave 102%, as contrasted with 75% for the same untreated oil, and after 7 days 116% for the peroxide inhibitor containing oil as compared with 64% of the untreated oil.

The examples show clearly that the peroxide inhibitor, which prevented deterioration of the oil in its chlortetracycline producing capacity, also increased the yield over that of the untreated, fresh oil.

The percent of yield as compared with a control sample varies with the oil and the method of storing. Even different samples of lard oil would give wide variations, ranging from a yield of less than 40% after 10 days storage while being aerated at room temperature, to samples which would last nearly 100 days before the effective yield dropped below 50%. With stationary storage at 27° C. the degeneration is somewhat smaller and slightly more consistent, but will frequently drop to a yield of from 50 to 60% after storage from 60 to 80 days.

A series of tests run on a group of commercially available oils, using the oil fresh, as purchased, with all other conditions the same, and as above described, gave the following yields, compared with the same oil without the peroxide inhibitor (0.05% Tenox II): 113%, 126%, 112%, 102%, 112%, 109%, and 105%.

Peroxide inhibitors, in amounts which will keep the peroxide value of an oil below the value reached in an untreated oil under comparable storage conditions, will give increased antibiotic yields. For best results, the peroxide inhibitor should cause the concentration of peroxide in the oil, at time of use, to be below that of fresh oil. The exact quantity for best yields, of course, varies with the particular inhibitor, the oil and storage conditions, but a determination of the peroxide value of the oil shows the relative merit of the inhibitor.

With 0.05% added to a lard oil, the following relative yields were obtained:

|  | Chlortetracycline Yields | | | | Peroxides |
|---|---|---|---|---|---|
| Days at 37° C. | 0 | 7 | 13 | 24 | |
| Refrigerated control | 100 | 100 | 100 | 100 | 22.7 |
| No antioxidant | 100 | 100 | 90 | 81 | 106. |
| Nordihydroguaiaretic acid | 106 | 102 | 111 | 106 | 5.1 |
| Lecithin | 103 | 100 | 96 | 83 | 105.2 |
| Propyl gallate | 102 | 102 | 108 | 102 | 8.7 |
| Tocopherol | 102 | 100 | 101 | 90 | 50.9 |
| Tenox II | 104 | 102 | 109 | 100 | 15.6 |

The peroxide concentration is given in milli-equivalents per 1000 grams of oil after 24 days at 36° C.

Having thus disclosed my invention, I hereby claim:

1. In the fermentation of a nutrient medium containing a triglyceride oil with an organism of the genus Streptomyces, the improvement comprising adding to the triglyceride oil from 0.05% to 0.5% of a peroxide formation inhibitor.

2. The process of claim 1, in which the Streptomyces is *Streptomyces aureofaciens*.

3. In the fermentation with an organism of the genus Streptomyces of a nutrient medium containing from 5 to 30 grams per liter of a triglyceride oil, a source of carbohydrate, and a source of organic nitrogen, the improvement comprising adding to the triglyceride oil from 0.05% to 0.5% of a peroxide formation inhibitor.

4. The process of claim 3, in which the Streptomyces is *Streptomyces aureofaciens*.

5. The process of claim 1 in which the peroxide formation inhibitor is selected from the group consisting of alkylated gallic esters, alkylated anisoles, nordihydroguaiaretic acid, tocopherol and their mixtures.

6. The process of claim 2 in which the peroxide formation inhibitor is selected from the group consisting of alkylated gallic esters, alkylated anisoles, nordihydroguaiaretic acid, tocopherol and their mixtures.

7. The process of claim 3 in which the peroxide formation inhibitor is selected from the group consisting of alkylated gallic esters, alkylated anisoles, nordihydroguaiaretic acid, tocopherol and their mixtures.

8. The process of claim 4 in which the peroxide formation inhibitor is selected from the group consisting of alkylated gallic esters, alkylated anisoles, nordihydroguaiaretic acid, tocopherol and their mixtures.

9. The process of claim 1 in which the peroxide formation inhibitor comprises a mixture of propylene glycol, butylated hydroxyanisole, n-propyl gallate and citric acid.

10. The process of claim 2 in which the peroxide formation inhibitor comprises a mixture of propylene glycol, butylated hydroxyanisole, n-propyl gallate and citric acid.

11. The process of claim 3 in which the peroxide formation inhibitor comprises a mixture of propylene glycol, butylated hydroxyanisole, n-propyl gallate and citric acid.

12. The process of claim 4 in which the peroxide formation inhibitor comprises a mixture of propylene glycol, butylated hydroxyanisole, n-propyl gallate and citric acid.

References Cited in the file of this patent

UNITED STATES PATENTS

| 2,550,450 | Brown | Apr. 24, 1951 |
| 2,586,762 | Finlay et al. | Feb. 19, 1952 |
| 2,609,329 | Niedercorn | Sept. 2, 1952 |

FOREIGN PATENTS

| 679,087 | Great Britain | Sept. 10, 1952 |

OTHER REFERENCES

American Meat Institute Foundation, Bulletin No. 4, January 1949 (entire bulletin 6 pp.), issued by A. M. I. F., 5737 Drexel Avenue, Chicago 37, Illinois, pp. 1, 2 and 5 relied upon. (Copy in Division 63.)